United States Patent Office 3,804,841
Patented Apr. 16, 1974

3,804,841
AMINO-ACID ESTER DERIVATIVES OF
2H-CHROMEN-5-OL
Raj K. Razdan, Belmont, Harry G. Pars, Lexington, and Klaus Kurt Weinhardt and John F. Howes, Cambridge, Mass., assignors to Arthur D. Little, Inc., Cambridge, Mass.
No Drawing. Filed July 16, 1971, Ser. No. 163,509
Claims priority, application Great Britain, July 17, 1970, 34,861/70
Int. Cl. C07d 31/42
U.S. Cl. 260—293.58                                           6 Claims

ABSTRACT OF THE DISCLOSURE

Certain amino acid ester derivatives and their acid addition salts which have anti-depressant and anti-anxiety properties. The amino acid ester group is an esterified 5-OH pyridyl benzopyran.

This invention relates to derivatives of substituted pyridyl benzopyrans having an esterified hydroxyl group in the 5-position, to processes for making these compounds and to pharmaceutical compositions containing them. Certain compounds within the scope of the present invention have useful pharmaceutical activity.

British patent specification No. 1,162,784 discloses pyridyl benzopyrans, one category of which has the general Formula I

[Structure of Formula I: pyridyl benzopyran with OH at 5-position, $R_1^1$ substituents and $R_2^1$ substituent]

(I)

wherein $R_1^1$ represents a $C_{1-6}$ alkyl group and $R_2^1$ a $C_{1-20}$ alkyl group certain of which compounds have central nervous systems activity.

Further, in co-pending patent application Ser. No. 151,578 filed June 9, 1971 now U.S. Pat. 3,726,883, as a continuation-in-part of Ser. No. 36,466 filed May 11, 1970, now abandoned, certain esters excluding amino acid esters and ethers of the compounds of general Formula II are disclosed which compounds also exhibit pharmacological activity in the central nervous system.

It has now been discovered that certain amino acid ester derivatives of the compounds disclosed in the British Pat. 1,162,784 may be prepared and that these new derivatives also display pharmacological activities selected from anti-hypertensive, analgesic, cardiovascular, anti-depressive and anti-anxiety activities. Furthermore, many of these compounds have low toxicity.

Many of these amino acid ester derivatives and their salts also have solubility characteristics which may cause them to be preferred to the compounds of the previous inventions.

Accordingly, the present invention provides esterified derivatives of pyridyl benzopyrans of general Formula II:

[Structure of Formula II: pyridyl benzopyran with $O.CO.X.NR_3R_4$ at 5-position, $R_1$ substituents and $R_2$ substituent]

(II)

wherein $R_1$ is an non-aromatic lower hydrocarbon group and $R_2$ is a non-aromatic hydrocarbon group of 1 to 20 carbon atoms, and X is a divalent hydrocarbon group containing 1 to 10 carbon atoms, $R_3$ is a hydrogen atom or a hydrocarbon group which may be joined to $R_3$ if required, and pharmaceutically acceptable acid addition salts or acyl derivatives thereof.

The term "lower" implies that the group contains from 1 to 6 carbon atoms.

Suitable groups $R_1$ include saturated and unsaturated groups, both straight chain and branched, for example methyl, ethyl, propyl, isopropyl, vinyl, allyl, butenyl, butynyl, hexyl and the like. The methyl group is preferred.

Suitable groups $R_2$ include saturated and unsaturated branched and straight chain aliphatic groups including for example those stated to be suitable groups for $R_1$ and in addition for example n-heptyl, 3-methyl-2-octyl, 2-octyl, 2-tetradecyl, n-heptadecyl, 2-eicosanyl, 3-methyloct-2-en-2-yl and the like and alicyclic groups of 3–8 carbon atoms and combination of open chain and cyclic aliphatic groups for example cyclopropyl, cyclobutyl, 2-methyl-cyclobutyl, cyclohexyl, cyclohexenyl, 4-methylcyclohexyl, cyclooctyl, cyclohexylpropyl, 4-methylcyclohexylpropyl and the like. In general, aliphatic groups containing from 5 to 12 carbon atoms are preferred, the group $$CH(CH_3)CH(CH_3)C_5H_{11}$$

being particularly preferred.

Suitable groups X not joined to $R_3$ include divalent aliphatic, aryl or arylaliphatic groups containing from 1 to 10 carbon atoms which may be straight chain or branched, for example, $—(CH_2)_n—$ where $n$ is 1 to 6, $—CH_2—C_6H_4—$, $—CH(CH_3)—CH_2—$, $—CH(CH_2Ph)—$ and the like.

Suitable groups $R_3$ not joined to X or $R_4$ include H, a lower alkyl group, $—CPh_3$, $—Ph$ and the like.

Suitable groups $R_4$ not joined to $R_3$ include H, a lower alkyl group, $—CPh_9$, Ph and the like.

Suitable groups $XNR_3R_4$ wherein X and $R_3$ are joined include groups of the type:

[Three cyclic structures shown: $—(CH_2)—$ linked to piperazine $N—R_4$, piperazine $N—R_4$, and a ring with $CH_4$ and $N—R_4H_4$]

Suitable groups $NR_3R_4$ when $R_3$ and $R_4$ are joined include 5, 6 and 7 membered heterocyclic groups such as the piperidine, piperazine, morpholine, pyrrolidyl and like groups.

Preferred groups $XNR_3R_4$ include $—(CH_2)_mNR_5R_6$ wherein $m$ is 1 to 6 and $R_5$ and $R_6$ are $C_{1-6}$ alkyl groups or together with the N atom form a 5 or 6 membered ring, and $—(CH_2)_pC_6H_4NR_5R_6$ wherein $p$ is 0 or 1.

The compounds of the present invention may with advantage be in the form of the mono- or di-acid addition salt. In the case of the mono-acid addition salt, the acid may be associated either with the basic function of the pyridyl group or the amino group $NR_3R_4$ depending on the relative basicity of the nitrogen atoms. In general a mono acid addition salt will be preferred.

Typical salts may be those formed with mineral acids such as hydrochloric, hydrobromic, sulphuric, phosphoric and the like or with organic acids such as acetic, lactic, citric, tartaric, toluene-sulphonic and the like.

The invention also includes geometric, optical and stereo isomers of compounds of general Formula II.

We have found that compounds of general Formula II and their acid addition salts or acyl derivatives have inherent pharmacodynamic activity of a type to be more fully described hereinbelow. This inherent pharmacodynamic activity can be enjoyed in useful form for pharmaceutical purposes employing the compounds themselves or the acid addition salts or other derivatives formed from pharmaceutically acceptable acids or esters of strong acids, that is, acids or esters whose anions are innocuous to the animal organism in effective doses of the salts so that beneficial properties inherent in the common structural entity represented by the free bases are not vitiated by side-effects ascribable to the anions.

In utilizing this pharmacodynamic activity of the compounds of the invention, often pharmaceutically-acceptable non-toxic salts are used. Although enhanced water-insolubility, increased toxicity, or lack of crystalline character may make some particular salt species less suitable or less desirable for use as such in a given pharmaceutical application, the water-insoluble or more toxic salts can be converted to pharmaceutically-acceptable compounds by techniques well known in the pharmaceutical art.

It will be appreciated from the foregoing that all of the acid addition salts of our new compounds are useful and valuable compounds regardless of considerations of solubility, toxicity, physical form, and the like, and accordingly are within the purview of the instant invention.

The compounds of the general Formula II may be prepared by reacting a compound of general Formula III:

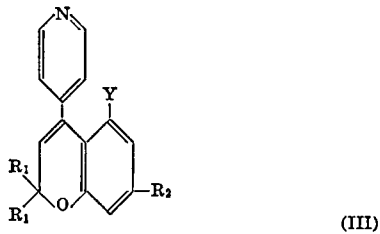

(III)

wherein Y is CH or a reactive derivative thereof such as an alkali metal salt or the like, or an acid addition salt where appropriate with an acid of general Formula $HOOC \cdot X \cdot NR_3R_4$ or an acylating derivative thereof.

In general the nitrogen atom of the amino acid is protected in some conventional manner, for example, by the formation of an acid addition salt, generally of a mineral acid such as hydrochloric or sulphuric acid or the like or when one or both of $R_3$ and $R_4$ is a hydrogen atom by the formation of a derivative, preferably one that is easily removed if it is desired to reform the free base at some later stage.

By an acylating derivative or an acid is meant such conventional derivatives as acid halides, particularly the acid chloride or bromide, or acid anhydrides and the like.

In a preferred process the compound $HOOC \cdot X \cdot NR_3R_4$ frequently in the form of an acid addition salt, is reacted with a compound of general Formula III in which Y is OH in the presence of a dehydrating agent such as, for example, a carbodiimide, such as dicyclohexylcarbodiimide.

The reaction will generally take place in an anhydrous inert solvent such as, for example, a halogenated hydrocarbon such as chloroform or methylene chloride or the like, or some other inert polar solvent such as tetrahydrofuran, dioxane or the like.

The reaction may take place at low, ambient or elevated temperatures but ambient temperatures will generally be preferred.

The Compound III (Y=OH) may be made by any convenient process, for example by the process disclosed in British Pat. 1,162,784 in which an appropriate pyridyl-propionic acid derivative IV is reacted with a substituted resorcinol V so as to form the coumarin VI

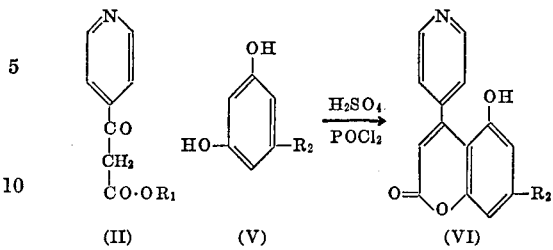

(II)     (V)     (VI)

where $R_1$ is lower alkyl or the like. The coumarin is then reacted with a Grignard reagent $R_1Mg\ Z$ where Z is chlorine, bromine or iodine to form Compound III.

Compounds within the scope of the present invention display useful cardiovascular and C.N.S. activity.

In particular the compound

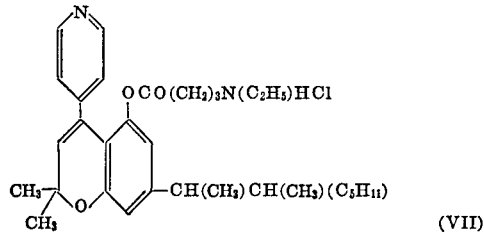

(VII)

depressed locomotor activity and displayed analgesic activity in mice and showed cardiovascular effects in anaesthetized dogs. It was found in particular to have enhanced analgesic activity when compared with a compound of general Formula I.

According to another aspect of the present invention therefore we provide a method for the treatment or prevention of cardiovascular and C.N.S. disorders which comprises the administration of the person suffering from the disorder or at risk thereof, of a therapeutically effective amount of a compound of the present invention.

Furthermore, many compounds of general Formula III and salts thereof in which Y is OH are very sparingly soluble in water. Compound VII on the other hand is freely soluble in water and the free base is soluble in dilute aqueous solutions of acids.

The present invention also provides pharmaceutical compositions containing as active ingredient a therapeutically effective amount of a compound of Formula II together with a pharmaceutically acceptable carrier.

The compounds can be prepared for use by dissolving under sterile conditions salts of the compounds in water (or an equivalent amount of a non-toxic acid if the free compounds of Formula II are used), or in a physiologically compatible aqueous medium such as saline, and stored in ampoules for intramuscular or intravenous injection. Alternatively, they can be incorporated in unit dosage form as tablets or capsules for oral administration either alone or in combination with suitable adjuvants or excipients such as calcium carbonate, starch, lactose, talc, magnesium stearate, gum acacia and the like. Still further the compounds can be formulated for oral administration in aqueous alcohol, glycol or oil solutions or oil-water emulsions in the same manner as conventional medicinal substances are prepared.

The following examples serve to illustrate the invention:

EXAMPLE 1

The 4-(diethylamino) butyrate hydrochloride of 2,2-dimethyl - 7 - (3 - methyl-2-octyl)-4-(4-pyridyl)-2H-chromen-5-ol A mixture of 2,2-dimethyl-7-(3-methyl-2-octyl)-4-(4-pyridyl)-2H-chromen-5-ol (0.7 g.), 4-diethylaminobutyric acid hydrochloride (0.37 g.) and dicyclohexylcarbodiimide (0.4 g.) in methylene chloride (15 ml.) was stirred at room temperature for 50 hours. The dicyclohexyl urea which had precipitated was removed by filtration and the filtrate concentrated to a small volume (5 ml.). Addition of ether caused crystallization of small needles which were collected and dried in vacuo (0.89 g.), M.P. 88–91°. Recrystallization from cyclohexane afforded the 4-(diethylamino)butyrate hydrochloride of 2,2-dimethyl-7-(3-methyl-2-octyl)-4-(4-pyridyl) - 2H - chromen-5-ol (0.71 g., 69%), M.P. 84–86°.

EXAMPLE 2

The 3-(diethylamino) propionate hydrochloride of 2,2-dimethyl-7-(3-methyl-2-octyl) - 4 - (4 - pyridyl)-2H-chromen-5-ol A mixture of 2,2-dimethyl-7-(3-methyl-2-octyl)-4-(4-pyridyl)-2H-chromen-5-ol (2.8 g.), 3-diethylaminopropionic acid hydrochloride (1.4 g.) and dicyclohexylcarbodiimide (1.6 g.) was stirred in methylene chloride (50 ml.) at room temperature for 50 hours. Following the procedure outlined in Example 1, there was obtained the 3-(diethylamino) propionate hydrochloride of 2,2-dimethyl-7-(3-methyl-2-octyl)-4-(4 - pyridyl)-2H-chromen-5-ol (1.2 g., 30%), M.P. 96–99°.

EXAMPLE 3

The 4-(dimethylamino) benzoate of 2,2-dimethyl-7-(3-methyl-2-octyl)-4-(4-pyridyl)-2H-chromen-5-ol Sodium hydride (400 mg. of 60% dispersion) was added portionwise to a solution of 2,2-dimethyl-7-(3-methyl-2-octyl)-4-(4-pyridyl)-2H-chromen-5-ol (3.79 g.) in dry benzene (30 ml.) and the mixture stirred for 1 hour. 4-Dimethylaminobenzoyl chloride (1.83 g.) was then added and the solution heated under reflux with stirring. After one hour, additional 4-dimethylaminobenzoyl chloride (1.83 g.) was added and heating continued for a further 2 hours. The solution was then cooled, poured into water and basified with sodium carbonate solution. Isolation through ether gave a gum which was adsorbed from light petroleum on silica gel (200 g.). Elution with progressively graded mixtures of light petroleum and ether afforded the 4-(dimethylamino) benzoate of 2,2-dimethyl-7-(3-methyl-2-octyl)-4-(4-pyridyl)-2H-chromen-5-ol (4.30 g., 82%), M.P. 100–110°.

EXAMPLE 4

The 4-(tritylamino)phenylacetate of 2,2-dimethyl-7-(3-methyl-2-octyl)-4-(4-pyridyl)-2H-chromen-5-ol A mixture of 2,2-dimethyl-7-(3-methyl-2-octyl)-4-(4-pyridyl)-2H-chromen-5-ol (3.79 g.), 4-(tritylamino) phenylacetic acid (3.81 g.) and dicyclohexylcarbodiimide (2.17 g.) in methylene chloride (80 ml.) was stirred for 22 hours. The solution was then filtered and evaporated. The residue was adsorbed from light petroleum on silica gel (250 g.). Elution with progressively graded mixtures of light petroleum and ether afforded the 4-(tritylamino) phenylacetate of 2,2-dimethyl-7-(3-methyl-2-octyl)-4-(4-pyridyl)-2H-chromen-5-ol (4.3 g., 57%), M.P. 164–170°.

EXAMPLE 5

The 4-aminophenylacetate of 2,2-dimethyl-7-(3-methyl-2-octyl)-4-(4-pyridyl)-2H-chromen-5-ol A mixture of the 4-(tritylamino) phenylacetate of 2,2-dimethyl-7-(3-methyl - 2 - octyl) - 4 - (4-pyridyl)-2H-chromen-5-ol (3.3 g.), acetic acid (95% 30 ml.) and concentrated hydrochloric acid (5 drops) was stirred for 30 minutes. The solution was basified with sodium carbonate and extracted with chloroform. Evaporation of the chloroform extract gave a gum which was adsorbed from light petroleum on silica gel. Elution with progressively graded mixtures of light petroleum and ether afforded the 4-aminophenylacetate of 2,2-dimethyl-7-(3-methyl-2-octyl)-4-(4-pyridyl)-2H-chromen-5-ol (1.35 g., 60%), M.P. 80–85°.

EXAMPLE 6

The 6-tritylamino) caproate of 2,2-dimethyl-7-(3-methyl-2-octyl)-4-(4-pyridyl)-2H-chromen-5-ol A mixture of 2,2-dimethyl-7-(3-methyl-2-octyl)-4-(4-pyridyl)-2H-chromen-5-ol (3.79 g.), 6-tritylamino) caproic acid (3.73 g.) and dicyclohexylcarbodiimide (2.17 g.) in methylene chloride (100 ml.) was stirred for 3 days. The solution was then filtered and evaporated. The residue was adsorbed from light petroleum on silica gel (250 g.). Elution with progressively graded mixtures of light petroleum and ether afforded the 6-(tritylamino) caproate of 2,2-dimethyl-7-(3-methyl - 2 - octyl)-4-(4-pyridyl)-2H-chromen-5-ol (4 g., 55%) as a glass.

EXAMPLE 7

The N-tritylpiperidine 4-carboxylate of 2,2-dimethyl-7-(3-methyl-2-octyl)-4-(4-pyridyl)-2H-chromen-5-ol A mixture of 2,2-dimethyl-7-(3-methyl-2-octyl)-4-(4-pyridyl)-2H-chromen-5-ol (5.10 g.), N-tritylpiperidine 4-carboxylic acid (5.0 g.) and dicyclohexylcarbodiimide (2.93 g.) in methylene chloride was stirred for 3 days. The solution was then filtered and evaporated. The residue was adsorbed from light petroleum on silica gel (300 g.). Elution with progressively graded mixtures of light petroleum and ether afforded the N-tritylpiperidine 4-carboxylate of 2,2-dimethyl-7-(3-methyl - 2 - octyl)-4-(4-pyridyl)-2H-chromen-5-ol (5.86 g., 59%), M.P. 113–117°.

EXAMPLE 8

The piperidine 4-carboxylate of 2,2-dimethyl-7-(3-methyl-2-octyl-4-(4-pyridyl)-2H-chromen-5-ol A mixture of the N-tritylpiperidine 4-carboxylate of 2,2-dimethyl-7-(3-methyl - 2 - octyl) - 4 - (4-pyridyl)-2H-chromen-5-ol(1.2 g.), acetic acid (95%, 15 ml.) and concentrated hydrochloric acid (3 drops) was stirred for 2 hours. The solution was basified with sodium carbonate and extracted with chloroform. Evaporation of the chloroform extract gave a gum which was adsorbed from light petroleum on alumina (activity II). Elution with progressively graded mixtures of light petroleum and ether afforded the piperidine 4-carboxylate of 2,2-dimethyl-7-(3-methyl-2-octyl)-4-(4-pyridyl)-2H-chromen-5-ol (500 mg., 62%) as a gum.

EXAMPLE 9

The 3-(N-piperidino)-propionate dihydrochloride of 2,2-dimethyl-7-(3-methyl - 2 - octyl)-4-(4 - pyridyl)-2H-chromen-5-ol A mixture of 2,2-dimethyl-7-(3-methyl-2-octyl)-4-(4-pyridyl)-2H-chromen-5-ol (3.79 g.), 3 - (N-piperidino)-propionic acid hydrochloride (1.93 g.) and dicyclohexylcarbodiimide (2.17 g.) in methylene chloride (200 ml.) was stirred for 48 hours. The dicyclohexyl urea which had precipitated was filtered off and the filtrate concentrated to a small volume. Ether was added to the solution and the precipitated hydrochlorides filtered off. The 3-(N-piperidino)-propionate of 2,2-dimethyl-7-(3-methyl-2-octyl)-4-(4-pyridyl)-2H-chromen-5-ol was isolated as the dihydrochloride after repeated recrystallizations from ethyl acetate-light petroleum, M.P. 110–115°.

We claim:
1. A compound of the Formula II:

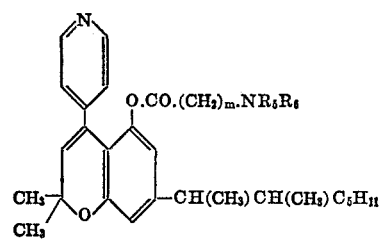

or a pharmaceutically acceptable acid addition salt thereof, wherein $m$ is an integer from 1 to 6, $R_5$ is an alkyl group of 1 to 6 carbon atoms, $R_6$ is an alkyl group of 1 to 6 carbon atoms or $NR_5R_6$ is a member selected from the group consisting of pyrrolidino, piperidino and piperidyl-4- and N-trityl-piperidyl-4-.

2. A compound of claim 1 wherein $m$ is 2 or 3.

3. A compound of claim 1 wherein $R_5$ is methyl or ethyl and $R_6$ is methyl or ethyl.

4. The compound of claim 1 which is 2,2-dimethyl-7-(3-methyl-2-octyl)-4-(4-pyridyl)-2H-chromen-5-ol-4-,diethylamino)butyrate or pharmaceutically acceptable acid addition salt thereof.

5. The compound of claim 1 which is 2,2-dimethyl-7-(3-methyl-2-octyl)-4-(4-pyridyl)-2H-chromen-5-ol-3-(diethylamino)propionate or a pharmaceutically acceptable acid addition salt thereof.

6. The compound of claim 1 which is 2,2-dimethyl-7-(3-methyl-2-octyl)-4-(4-pyridyl)-2H-chromen-5-ol-($3^1$-N-piperidino)-propionate or a pharmaceutically acceptable acid addition salt thereof.

References Cited

FOREIGN PATENTS 1,162,784    8/1969    Great Britain.

HENRY R. JILES, Primary Examiner

M. A. M. CROWDER, Assistant Examiner

U.S. Cl. X.R.

260—295 F; 424—263